March 3, 1931.  T. B. TIEFENBACHER  1,794,931
CONNECTER
Filed Sept. 26, 1928  2 Sheets-Sheet 1
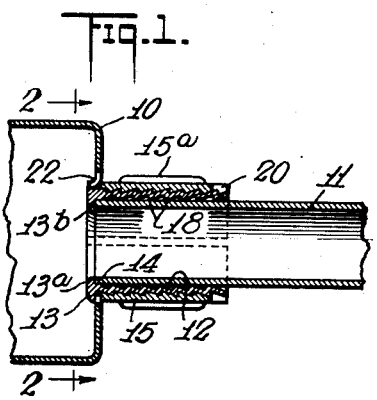
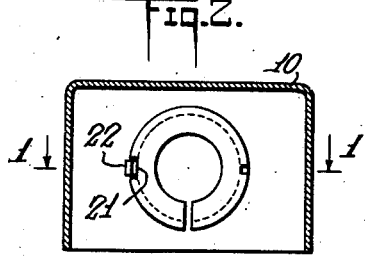
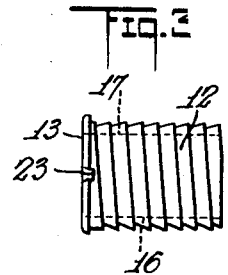
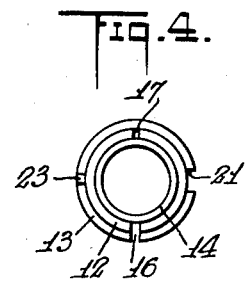
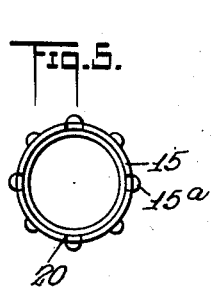
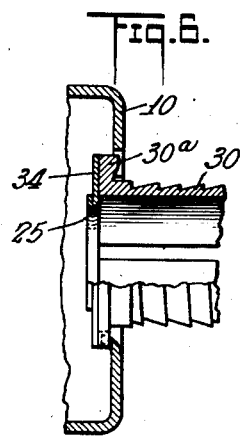
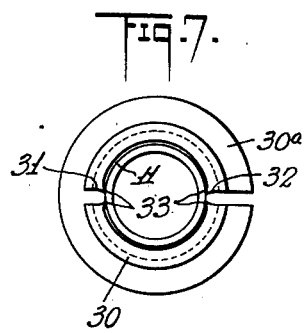
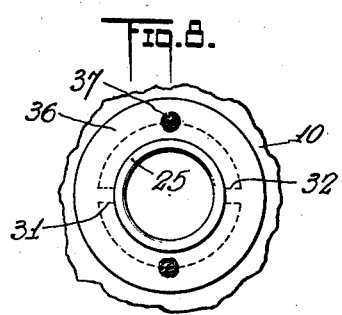
INVENTOR
Thomas B. Tiefenbacher
BY
Franklin J. Foster
ATTORNEY March 3, 1931.  T. B. TIEFENBACHER  1,794,931
CONNECTER
Filed Sept. 26, 1928   2 Sheets-Sheet 2
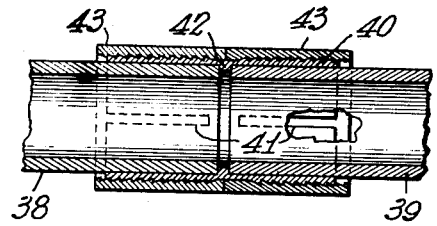
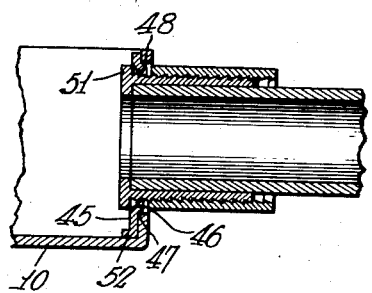
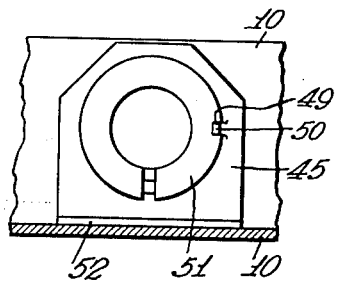
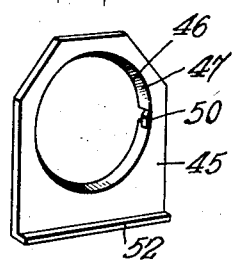
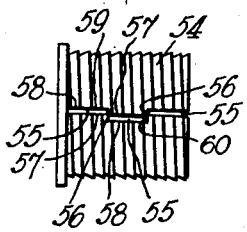
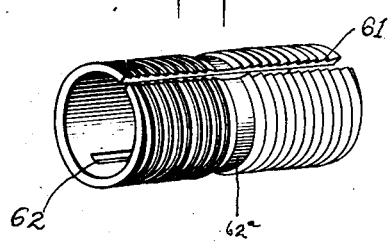
INVENTOR
Thomas B. Tiefenbacher
BY
Franklin J. Foster
ATTORNEY Patented Mar. 3, 1931

1,794,931

UNITED STATES PATENT OFFICE

THOMAS B. TIEFENBACHER, OF ELIZABETH, NEW JERSEY, ASSIGNOR TO ERIE MALLEABLE IRON COMPANY, OF ERIE, PENNSYLVANIA, A CORPORATION OF PENNSYLVANIA

CONNECTER

Application filed September 26, 1928. Serial No. 308,416.

The connecter of my present invention may have a wide range of utility as for instance connecting electric cables operating as a pipe coupling device but finds its preferred embodiment as a connecter for electrical conduits and is of the character which obviates the need for threading the ends of such conduits.

It may be conveniently used for coupling conduits to outlet boxes, coupling a pair of axially alined conduits together or in many connections where a pipe is to be attached to a standard or special fitting.

One object of the invention is to provide a connecter involving two sleeves, one of which is slotted and adapted to be forced radially into clamping engagement with a member to be connected by the wedging action of wedge surfaces, said wedge surfaces being of a form permitting the assembly of the sleeves, one within the other, by axial and rotative movement, the axial movement being in a direction opposite that toward which the wedge surfaces face, preferably this assembly being accomplished by forming the wedge surfaces in a spiral, or screw form so that said wedge surfaces may be assembled by screwing one sleeve into the other.

Another object of the invention is to provide a connecter of this character in which the use of tapered sleeves, nuts and bushings is avoided and the contraction of the pipe gripping element effected positively and in a manner to exert a powerful grip by the simple expedient of screwing an outer cylindrical member over the split cylindrical gripper.

Another object is to provide a threaded fitting which when once tightened will be highly resistant to backing up or loosening either under severe vibration or under compression, tension or torsion strains and stresses imposed on the pipe which it secures.

Another object is to provide a coupling which may be used to attach an unthreaded conduit with expedition and facility to a standard fitting, such, for instance, as an ordinary knockout outlet box.

Another object is to provide a fitting presenting no sharp internal edges or projections likely to bind or tear the coverings of electrical conductors passed therethrough.

Another object is to provide a fitting which, when used outdoors or in damp locations will prevent access of moisture to the electrical conductors which it houses.

Other and further objects are to provide a fitting of simple practical construction which will be rugged, durable and efficient in use and will be well suited to the requirements of economical manufacture.

In a preferred embodiment of the invention the fitting includes a cylindrical split bushing which receives the unthreaded end of the conduit and which is preferably provided with internal means for limiting the insertion of the conduit into the bushing and with means to bite into and grip the conduit when the bushing is contracted.

An internally threaded cylindrical nut or sleeve is screwed onto the bushing, the threaded connection between nut and bushing being such that when the threaded telescoping of the nut over the bushing is checked by a stop member, further tightening of the nut will cause it to back up on the bushing and the engaged threads of the nut and bushing will cooperatively exert a camming action to contract the bushing and cause it to grip the conduit.

The stop means may be the outer face of an outlet box or other fitting to which the bushing is attached. It may be the end of a second nut screwing onto the reversely threaded opposite end of a double bushing or it may be a shoulder on the bushing itself.

Obviously the ordinary standard thread and in fact most threads would not provide the desired camming action inasmuch as they do not define the relatively long sloping faces necessary for effective compression under a comparatively slight twisting force on the nut. I have found the most efficient thread for accomplishing the desired result to be what I term a reverse buttress in which short straight shoulders and relatively long sloping faces between shoulders provide the thread. The term reverse is used because contrary to the action of the usual buttress thread the tightening strain is taken on the inclined faces rather than against the shoulders and in consequence a very powerful camming action is had between two long spiral cams.

It will also be evident that the thread need not be a true buttress, that is to say, the shoulder need not be at exact right angles to the longitudinal axis of the threaded member but may be either undercut or tapered in the opposite direction, the exact angle defined by shoulders and sloping faces being of less importance than the angle of the sloping faces to the longitudinal axis of the threaded member. This angle also may be varied within reasonable limits, it being understood that the steeper the slope becomes the poorer the camming leverage will become and the turning force necessary to effect camming will be increased.

In view of the above circumstances the term buttress thread as used hereinafter in the specification and claims is intended to cover all minor variations of a true buttress which are operative to produce the result desired, i. e., effective contraction of the bushing by ordinary wrench applied manual twisting of the nut.

The present application is a continuation in part of my co-pending application Serial No. 208,858, filed July 27th, 1927.

With the above and other objects in view, the invention consists in certain novel features of construction and combinations and arrangements of parts, as will be more fully hereinafter set forth and pointed out in the claims. The invention may be more fully understood from the following description in connection with the accompanying drawings, wherein the embodiment of the invention is illustrated as a connecter in the form of a conduit fitting as follows:

Figure 1 is a sectional plan view showing a conduit secured to an outlet box by means of my improved coupling.

Figure 2 is a transverse sectional view on the line 2—2 of Figure 1.

Figure 3 is a side elevational view of the split bushing which engages the pipe end.

Figure 4 is an end view thereof.

Figure 5 is an end view of the sleeve or nut which engages the bushing to contract the same and cause it to grip the pipe.

Figure 6 is a view showing a modified type of bushing in operative position within an outlet box.

Figure 7 is an end view of the modified form of bushing showing a pipe therein before the sleeve or nut has been applied to circumferentially contract the bushing.

Figure 8 is an enlarged end elevation of the opposite end of the bushing showing the novel method of spot welding a solid gasket thereon without interfering with the circumferential contractibility of the bushing.

Figure 9 is a longitudinal section through a coupling for the alined end of two conduits, which coupling illustrates another embodiment of the invention.

Figure 10 is a longitudinal sectional view similar to Figure 1 but illustrating a further modification and taken on the line 10—10 of Figure 11.

Figure 11 is an end view of the device of Figure 10 taken from the inside of the outlet box.

Figure 12 is a perspective view of the washer used with the device of Figures 10 and 11.

Figure 13 is a side elevational view of a slightly modified form of watertight bushing.

Figure 14 is a perspective view of a further modfiied type of bushing for coupling the two conduits.

Referring first to Figures 1 to 5 of the drawings, I have used the reference numeral 10 to designate a conventional type of outlet box, and the number 11 to represent the end of a conduit or pipe to be coupled to the box. The coupling consists essentially of a split bushing 12 projecting outwardly through an opening in the outlet box and formed at one end with a flange 13 to abut the inner face of the box. An inward extension 13a of this flange defines a shoulder 14 against which the end of the pipe 11 abuts. The bushing is contracted to grip the pipe 11 by screwing a nut or sleeve 15 over it. Bushing 12 is preferably formed with two longitudinal slots 16 and 17 therein; the slot 16 extending from end to end of the bushing and slot 17 extending from the flange 13 to the opposite end of the bushing. These parallel and preferably diametrically opposed slots permit circumferential contraction of the bushing so that the latter may grip the end of the pipe 11.

The entire body of the bushing from the flange to the opposite end is threaded in a peculiar manner. This thread which is of the jamming type is termed a reverse buttress thread inasmuch as the strain thereon is taken by the inclined faces of the thread rather than by the shoulders. In Figure 1, the bushing 12 has the thread formed therein by rolling, so that in addition to the exterior reverse buttress thread there is provided a continuous sharp spiral rib 18 interiorly of the bushing which serves to bite into and firmly grip the pipe 11.

The bevelled faces of the reverse buttress threads are shown disposed at an angle of approximately 15° or 20° to the longitudinal axis of the bushing 12, thereby affording long sloping cam surfaces for a purpose which will be later described.

The nut 15 is formed with an internal thread mating with the external thread of the bushing 12. The nut may also be provided with projections such as 15a to permit the application of a wrench thereto, may be formed with diametrically opposite notches 20 in its ends for the reception of a sparker wrench or may be of hexagon or other conventional polygonal exterior shape.

The flange 13 is provided with means for locking the bushing against rotation. Such means may conveniently include one or more notches 21 receiving lugs 22 on the inner face of the outlet box, or may comprise one or more lugs 23 entering notches in the outlet box.

The operation of the device is substantially as follows: Bushing 12 is first applied by entering it into the interior of the box, pushing it through the box opening and alining the notches 21 or lugs 23 as the case may be, with corresponding parts of the box. The nut 15 is then screwed over the bushing 12 until it abuts the outlet box. The conduit end is then inserted into the bushing. Further tightening of the nut will tend to cause it to back up on the bushing, exerting a powerful camming action on the inclined faces of the reverse buttress threads 12 of the bushing, thereby contracting the bushing and jamming the spiral rib 18 into tight frictional engagement with the conduit 11.

The inner edge of the flange 13 is rounded off as at 13b so that it will present no sharp tearing corners which might rip the cover from an insulated wire.

In Figures 6 and 7 I have illustrated a slight modification in which a bushing 30 corresponding to the bushing 12 is formed with an external reversed buttress thread; the thread in this instance being produced by machining instead of by rolling, and the interior of the bushing being consequently smooth-surfaced. With this form of the invention, in order to provide some means for biting into the conduit, slots 31 and 32 corresponding to the slots 16 and 17 are punched in the bushing 30; the operation of punching the slots leaving inwardly projecting burrs such as 33 at each slot edge which serves to bite into the pipe 11 when the bushing is tightened by screwing home its nut.

With this form of the invention the stop flange for the pipe end is formed by the inwardly projecting margin of a split ring 34 welded or otherwise secured to the face of bushing flange 30a and having its split alined with the end of slot 31. The inner edge of this ring is rolled back at 35 providing a rounded surface to prevent tearing of the wire covers.

In Figure 8 a solid ring 36 is substituted for the split ring 34. By the simple expedient of spot welding this ring to the bushing flange at two points midway between the slots 31, 32, the inherent circumferential contractibility of the bushing is not seriously impaired. The two diametrically opposite spot welds are shown at 37 and serve as bending centers about which the principal distortion of bushing takes place as the bushing is contracted. Thus there is little danger of breaking the spot welds.

In Figure 9 I have shown a coupling which embodies the invention and which is used for connecting the unthreaded ends of two exactly alined conduits 38, 39.

This coupling includes bushing 40, provided with pairs of diametrically opposite slots 40 extending inwardly from opposite ends and preferably, (though not necessarily) terminating short of the center of the bushing, at which point an internal flange 42 defines a stop shoulder to limit the insertion of the pipe ends.

The two ends of the bushing are externally reverse buttress threaded, these threads being right hand and left hand threads respectively. Nuts 43 similar to the nuts above described are screwed into opposite ends of the bushing. After these nuts abut each other at the approximate center of the bushing, further tightening will cause them to exert a camming action on the bushing threads and contract the bushing to grip the pipes as heretofore explained.

In Figures 10 to 12 I have shown an embodiment of the invention designed to obviate the need for alteration in the standard outlet boxes, such, for instance, as the provision of slots or tongues in the boxes as suggested in Figures 1 to 5.

Here the rotation of the bushing in the outlet box opening is prevented by the use of a washer 45 of non-circular conformation. This washer (shown in perspective in Figure 12) has a central opening 46 to receive the bushing, and a centering flange 47 around the opening 46 to enter the outlet box opening 48 and center the bushing therein. The flat or straight lower edge of the washer rests on the bottom of the outlet box so that the washer cannot be rotated and the bushing is held against turning in the central washer opening 46 by an interlocking tongue and notch arrangement 49, 50 on washer and bushing flange 51. In order that the washer, which lies between the bushing flange and the inner face of the outlet box, may be made of thin gauge metal stock, without bending under the turning strain incidental to tightening the nut, a lip or flange 52 is turned over at the lower straight edge of the washer, said flange serving as a strengthening nut to resist bending strains.

In Figure 13 I have shown a slight modification of the bushing structure which is designed to effect water-proofing by preventing the leaking of water into the outlet box through the bushing slots.

This bushing 54 instead of having a continuous longitudinal slot is formed with a series of staggered slots 55 with adjoining corners 56. This slotting defines a series of interfitting tongues and grooves 57, 58. The shoulders 59 at the ends of the tongues slide snugly between the shoulders 60 at the ends of the grooves when the bushing is contracted. This series of tight-fitting sealing shoulders of course prevents water from passing into the outlet box through the bushing slots.

From the foregoing description it will be evident that it is within the spirit of the invention to use various means for causing the bushing to grip the pipe and various means to prevent rotation of the bushing in an outlet box. Numerous expedients may be resorted to for facilitating the application of different styles of standard wrenches to the nut, also for providing stop means for the pipe ends and defining abutments for the tightening nuts.

The bushing 62ª illustrated in Figure 14 represents a slight modification of the bushing 40 shown in Figure 9. This bushing similarly to the bushing 40, is provided internally with right and left hand reverse buttress threads. In splitting the bushing, however, for purposes of contractability, one slot 61 extends the full length of the bushing and a second diametrical opposition slot 62 extends from one end of the bushing to a point adjacent its other end.

In fact various changes and alterations may be made in the general form and arrangement of the parts described without departing from the scope of the appended claims.

I claim:

1. An electrical conduit fitting for attaching a conduit to an outlet box or the like including a longitudinally split bushing, one end of which is flanged to engage an outlet box or the like when the bushing is inserted through an opening in the box and provided with means for preventing rotation of the bushing in the opening, said bushing defining a socket for a conduit end, and having an external reversed buttress thread, a similarly internally threaded sleeve member screwed onto the bushing and acting when tightened against the box to back up and exert a camming action on all of the tapered surfaces of the bushing threads to contract the bushing and cause it to grip the conduit.

2. An electrical conduit fitting including a longitudinally split bushing, one end of which is flanged to engage an outlet box or the like when the bushing is inserted through an opening in the box, means to prevent rotation of the bushing in the opening, said bushing being adapted to receive a threadless conduit end and having an external thread therein defined by a relatively long sloping spiral shoulder at an acute angle to the axis of the bushing and a relatively short straight spiral shoulder at approximately right angles to the bushing axis, a similarly internally threaded sleeve member screwed onto the bushing and acting when tightened against the box to back up and exert a camming action on the sloping spiral shoulder of the bushing thread to contract the bushing and cause the bushing to grip the conduit.

3. An electrical conduit fitting including a longitudinally split bushing, one end of which is flanged to engage an outlet box or the like when the bushing is inserted through an opening in the box, means to prevent rotation of the bushing in the opening, said bushing being adapted to receive a threadless conduit end and having an external thread therein defined by a relatively long sloping spiral shoulder at an acute angle to the axis of the bushing and a relatively short straight spiral shoulder at approximately right angles to the bushing axis, a similarly internally threaded sleeve member screwed onto the bushing and acting when tightened against the box to back up and exert a camming action on the sloping spiral shoulder of the bushing thread to contract the bushing and cause the bushing to grip the conduit, the means to prevent rotation of the bushing in the opening including a washer encircling the bushing, locked against rotation independently thereof, and being of non-circular external configuration to engage the box bottom and block rotation of the bushing.

4. An electrical conduit fitting including a longitudinally split bushing adapted to receive an unthreaded conduit end and externally reverse-buttress threaded, a similarly threaded sleeve screwed onto the bushing and means limiting the extent to which the sleeve may be screwed over the bushing.

5. An electrical conduit fitting adapted to receive and grip an unthreaded conduit end, said fitting including a circumferentially contractible cylindrical sleeve defining a socket for the conduit end, the sleeve being externally screw-threaded by a thread which includes a relatively long, sloping face and a relatively short, straight face, a similarly threaded nut to screw into the sleeve and means providing an abutment for the end of the nut whereby further turning of the nut after it strikes the abutment causes contraction of the bushing.

6. In a connecter, the combination of two sleeves, one of which is slotted axially, said sleeves having engaging opposing wedge surfaces adapted to force the walls of the slotted sleeve radially into clamping engagement with a member to be connected with a relative axial movement of the sleeves, said wedge surfaces permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected.

7. In a connecter, the combination of two sleeves, one of which is slotted axially, said sleeves having engaging opposing wedge surfaces, the wedge surfaces having an inclination to the axis forming an angle less than twice the angle between the surfaces and a perpendicular to the axis and adapted to force the walls of the slotted sleeve radially into clamping engagement with a member to be connected with a relative axial movement of the sleeves, said wedge surfaces permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected.

8. In a connecter, the combination of two sleeves, one of which is slotted axially, said sleeves having engaging opposing wedge surfaces, the wedge surfaces having an inclination to the axis making the angle to the axis less than the angle to a perpendicular to the axis adapted to force the walls of the slotted sleeve radially into clamping engagement with a member to be connected with a relative axial movement of the sleeves, said wedge surfaces permitting the assembly of the sleeves, one within the other, by a relative axial and rotative movement of the opposing wedging surfaces of the sleeves and with the axial movement in directions opposite that faced by the wedge surfaces; and means forcing the sleeves axially into wedging engagement to force the walls of the slotted sleeve radially into clamping engagement with a member to be connected.

9. In a connecter, the combination of two sleeves, one of which is slotted axially, said sleeves having engaging opposing wedge surfaces adapted to force the walls of the slotted sleeve radially into clamping engagement with a member to be connected with a relative axial movement of the sleeves, said wedge surfaces being in the form of a screw and permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected.

10. In a connecter, the combination of two sleeves, one of which is slotted axially, said sleeves having engaging opposing wedge surfaces, the wedge surfaces having an inclination to the axis forming an angle less than twice the angle between the surfaces and a perpendicular to the axis and adapted to force the walls of the slotted sleeve radially into clamping engagement with a member to be connected with a relative axial movement of the sleeves, said wedge surfaces being in the form of a screw and permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected.

11. In a connecter, the combination of two sleeves, one of which is slotted axially, said sleeves having engaging opposing wedge surfaces adapted to force the walls of the slotted sleeve radially into clamping engagement with a member to be connected with a relative axial movement of the sleeves, said wedge surfaces permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected, said means comprising a nut screwed on to one of the sleeves and acting on the other of the sleeves.

12. In a connecter, the combination of two sleeves, one of which is slotted axially, said sleeves having engaging opposing wedge surfaces, the wedge surfaces having an inclination to the axis forming an angle less than twice the angle between the surfaces and a perpendicular to the axis and adapted to force the walls of the slotted sleeve radially into clamping engagement with a member to be connected with a relative axial movement of the sleeves, said wedge surfaces permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected, said means comprising a nut screwed on to one of the sleeves and acting on the other of the sleeves.

13. In a connecter, the combination of two sleeves, one of which is slotted axially, said sleeves having engaging opposing wedge surfaces adapted to force the walls of the slotted sleeve radially into clamping engagement with a member to be connected with a relative axial movement of the sleeves, said wedge surfaces being in the form of a screw and permitting the assembly of the sleeves, one within the other, by a relative axial and rotative movement of the sleeves and with the axial movement in directions opposite that faced by the wedge surfaces; and means forcing the opposing wedging surfaces of the sleeves axially into wedging engagement to force the walls of the slotted sleeve radially into clamping engagement with a member to be connected, said means comprising a nut screwed on to one of the sleeves and acting on the other of the sleeves.

14. In a connecter, the combination of two sleeves, one of which is slotted axially, said sleeves having engaging opposing wedge surfaces, the wedge surfaces having an inclination to the axis forming an angle less than twice the angle between the surfaces and a perpendicular to the axis and adapted to force the walls of the slotted sleeve radially into clamping engagement with a member to be connected with a relative axial movement of the sleeves, said wedge surfaces being in the form of a screw and permitting the assembly of the sleeves, one within the other, by a relative axial and rotative movement of the sleeves and with the axial movement in directions opposite that faced by the wedge surfaces; and means forcing the opposing wedging surface of the sleeves axially into wedging engagement to force the walls of the slotted sleeve radially into clamping engagement with a member to be connected, said means comprising a nut screwed on to one of the sleeves and acting on the other of the sleeves.

15. A fitting as set forth in claim 1 wherein the bushing is formed as an incident of punching the slot with an inwardly turned burr at the slot edges to bite into the conduit as the bushing is tightened.

16. A coupling for unthreaded conduit ends including a bushing longitudinally split and adapted to receive the ends of a pair of alined conduits, the bushing ends being externally oppositely reverse-buttress threaded and similarly internally threaded nuts to screw onto the bushing ends and abut each other.

Signed at New York in the county of New York and State of New York this 13th day of September, A. D., 1928.

THOMAS B. TIEFENBACHER.